US012065859B2

(12) United States Patent
Murphy et al.

(10) Patent No.: US 12,065,859 B2
(45) Date of Patent: Aug. 20, 2024

(54) INTERCHANGEABLE HANDLE LOCKSET

(71) Applicant: Schlage Lock Company LLC, Carmel, IN (US)

(72) Inventors: Nathanael S. Murphy, Colorado Springs, CO (US); Peter Malenkovic, Monument, CO (US)

(73) Assignee: Schlage Lock Company LLC, Carmel, IN (US)

( * ) Notice: Subject to any disclaimer, the term of this patent is extended or adjusted under 35 U.S.C. 154(b) by 780 days.

(21) Appl. No.: 16/941,046

(22) Filed: Jul. 28, 2020

(65) Prior Publication Data

US 2021/0010297 A1 Jan. 14, 2021

Related U.S. Application Data

(62) Division of application No. 15/466,932, filed on Mar. 23, 2017, now Pat. No. 10,724,274.

(Continued)

(51) Int. Cl.

*E05B 3/04* (2006.01)
*E05B 1/00* (2006.01)

(Continued)

(52) U.S. Cl.

CPC .............. *E05B 55/06* (2013.01); *E05B 1/003* (2013.01); *E05B 3/003* (2013.01); *E05B 3/04* (2013.01);

(Continued)

(58) Field of Classification Search

CPC ... Y10T 292/57; Y10T 292/59; Y10T 292/82; Y10T 292/85; Y10T 292/858; Y10T 292/861; Y10T 292/88; Y10T 292/91; Y10T 292/93; E05B 55/06; E05B 55/005; E05B 1/003; E05B 3/04; E05B 3/003; E05B 13/005; E05B 63/0056; E05B 63/16

See application file for complete search history.

(56) References Cited

U.S. PATENT DOCUMENTS 562,420 A 6/1896 Richards
1,522,628 A 1/1925 Holt (Continued)

OTHER PUBLICATIONS

International Search Report; International Searching Authority; International Application No. PCT/US2017/023827; Aug. 16, 2017; 4 pages.

(Continued)

*Primary Examiner* — Alyson M Merlino

(74) *Attorney, Agent, or Firm* — Taft Stettinius & Hollister LLP

(57) ABSTRACT

A handle set including a chassis and a handle mounted on the chassis. The handle includes a shank having a load bearing section, a primary actuating section, and a secondary actuating section. The chassis includes a housing, a support spindle, a primary actuator, and a secondary actuator. The support spindle is longitudinally coupled with the load bearing section, and the primary actuator is rotationally coupled with the primary actuating section of the handle. The handle set has a first configuration in which the secondary actuating section is engaged with the secondary actuator, and a second configuration in which the secondary actuating section is disengaged from the secondary actuator.

11 Claims, 12 Drawing Sheets

Related U.S. Application Data

(60) Provisional application No. 62/313,448, filed on Mar. 25, 2016.

(51) Int. Cl.
*E05B 3/00* (2006.01)
*E05B 13/00* (2006.01)
*E05B 55/00* (2006.01)
*E05B 55/06* (2006.01)
*E05B 63/00* (2006.01)
*E05B 63/16* (2006.01)

(52) U.S. Cl.
CPC .......... *E05B 13/005* (2013.01); *E05B 55/005* (2013.01); *E05B 63/0056* (2013.01); *E05B 63/16* (2013.01)

(56) References Cited

U.S. PATENT DOCUMENTS

| | | | | |
|---|---|---|---|---|
| 1,834,223 | A | 12/1931 | Rymer | |
| 2,244,238 | A | 6/1941 | Best | |
| 2,450,840 | A | 10/1948 | Milligan | |
| 2,662,387 | A | 12/1953 | Hagstrom | |
| 2,729,485 | A | 1/1956 | Schlage | |
| 3,345,103 | A | 10/1967 | Parkin et al. | |
| 3,381,508 | A | 5/1968 | Carlson et al. | |
| 3,602,539 | A | 8/1971 | James | |
| 3,774,320 | A | 11/1973 | Folberth, Jr. | |
| 4,502,720 | A * | 3/1985 | Fayerman | E05B 65/104 292/357 |
| 4,594,864 | A | 6/1986 | Hart | |
| 4,728,133 | A | 3/1988 | Valley | |
| 5,481,890 | A | 1/1996 | Millman | |
| 5,482,335 | A | 1/1996 | Zuckerman | |
| 5,564,296 | A | 10/1996 | Theriault et al. | |
| 6,351,976 | B1 | 3/2002 | Chen | |
| 8,449,005 | B1 | 5/2013 | Wang | |
| 2005/0156441 | A1 * | 7/2005 | Tsai | E05B 63/04 292/336.3 |
| 2006/0042336 | A1 | 3/2006 | Smith et al. | |
| 2007/0176436 | A1 * | 8/2007 | Newman | E05B 63/0056 292/347 |
| 2008/0252086 | A1 | 10/2008 | Houis | |
| 2008/0307836 | A1 | 12/2008 | Kim et al. | |
| 2010/0072762 | A1 | 3/2010 | Marks | |
| 2013/0009410 | A1 | 1/2013 | Ludwig et al. | |
| 2013/0015672 | A1 | 1/2013 | Nadgouda et al. | |
| 2014/0001772 | A1 | 1/2014 | Mani | |
| 2014/0047878 | A1 | 2/2014 | Zheng et al. | |
| 2015/0275544 | A1 | 10/2015 | Karnutsch et al. | |
| 2018/0058096 | A1 | 3/2018 | Ou et al. | |

OTHER PUBLICATIONS

Written Opinion; International Searching Authority; International Application No. PCT/US2017/023827; Aug. 16, 2017; 7 pages.

* cited by examiner

INTERCHANGEABLE HANDLE LOCKSET

CROSS-REFERENCE TO RELATED APPLICATIONS

The present application is a divisional of U.S. patent application Ser. No. 15/466,932 filed Mar. 23, 2017 and issued as U.S. Pat. No. 10,724,274, which claims the benefit of U.S. Provisional Patent Application No. 62/313,448 filed Mar. 25, 2016, the contents of which are each application hereby incorporated herein by reference in their entirety.

TECHNICAL FIELD

The present disclosure generally relates to interchangeable handle sets, and more particularly but not exclusively relates to door locks having interchangeable handles.

BACKGROUND

Locksets typically include a latch mechanism and a handle operable to actuate the latch mechanism. Such handles commonly serve as a user interface for interacting with the lockset to effect two main actions that are typically required to open a door. The two main actions typically include applying a rotational force to retract a latch bolt, and applying a pushing or pulling force to open or close the door. In order to accomplish these main actions, the handle typically needs to be capable of performing two primary functions. In order to perform the main primary action, the handle generally needs to be able to transfer torque from an end user's hand to the internal lock components, such that a spindle is rotated to activate the latch mechanism. Additionally, in order to perform the second main action, the handle generally needs to be able to adequately resist anticipated pulling forces that are encountered during door opening and closing. Often the level of pulling force is dictated by industry standards.

Due to the simple functional nature of the interface between handle and lock chassis, the interface of conventional locksets is often correspondingly simple. For example, certain conventional locksets have a single interface region through which rotational and axial loads are transmitted between the handle and the lock chassis. While these interfaces may provide for adequate performance of the primary actions, the selective addition of secondary actions may be impeded by the simple configuration of the interface. Accordingly, there remains a need for further contributions in this technological field.

SUMMARY

An exemplary handle set includes a chassis and a handle mounted on the chassis. The handle includes a shank having a load bearing section, a primary actuating section, and a secondary actuating section. The chassis includes a housing, a support spindle, a primary actuator, and a secondary actuator. The support spindle is longitudinally coupled with the load bearing section, and the primary actuator is rotationally coupled with the primary actuating section of the handle. The handle set has a first configuration in which the secondary actuating section is engaged with the secondary actuator, and a second configuration in which the secondary actuating section is disengaged from the secondary actuator. Further embodiments, forms, features, and aspects of the present application shall become apparent from the description and figures provided herewith.

DETAILED DESCRIPTION OF ILLUSTRATIVE EMBODIMENTS

Figure 1:
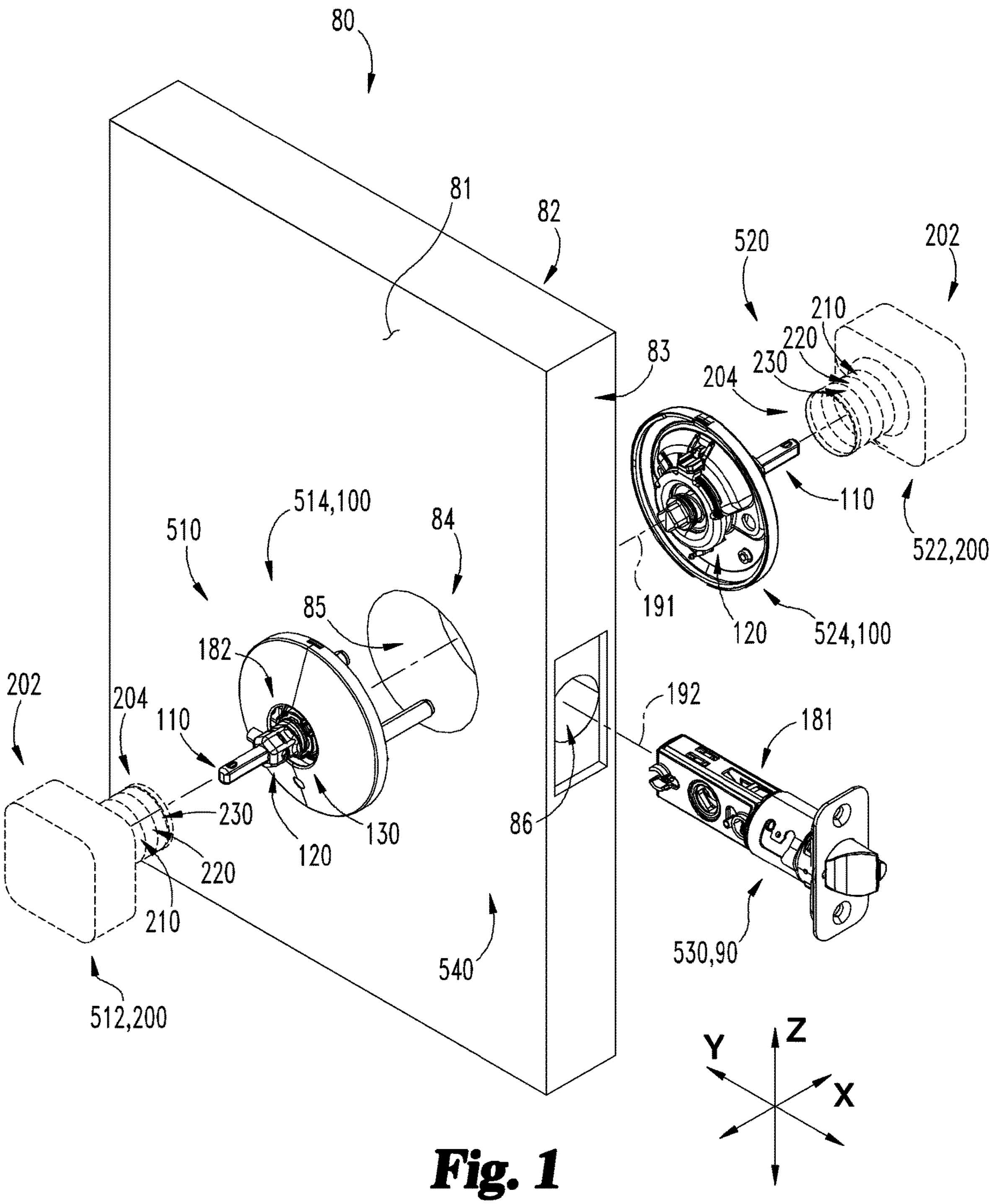
FIG. 1 is an exploded assembly view of a lockset according to one embodiment and a door.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

As used herein, the terms "longitudinal," "lateral," and "transverse" are used to denote motion or spacing along three mutually perpendicular axes, wherein each of the axes defines two opposite directions. In the coordinate system illustrated in FIG. 1, the X-axis defines first and second longitudinal directions, the Y-axis defines first and second lateral directions, and the Z-axis defines first and second transverse directions. Additionally, a cross-section which is described with reference to one of these axes refers to a cross-section that is taken along a plane perpendicular to the referenced axis. For example, a "longitudinal cross-section" would refer to a cross-section taken perpendicular to the X-axis, or along a transverse-lateral (Y-Z) plane. These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment. Furthermore, motion or spacing along a direction defined by one of the axes need not preclude motion or spacing along a direction defined by another of the axes. For example, elements which are described as being "laterally offset" from one another may also be offset in the longitudinal and/or transverse directions, or may be aligned in the longitudinal and/or transverse directions. The terms are therefore not to be construed as limiting the scope of the subject matter described herein.

With reference to FIG. 1, a lockset 500 according to one embodiment is configured for use with a door 80. The door 80 has an inner side 81, an outer side 82, and an edge 83. The door 80 also includes a door preparation 84 including a cross bore 85 and an edge bore 86. The cross bore 85 extends longitudinally through the door 80 between the inner side 81 and the outer side 82. The edge bore 86 extends laterally inward from the door edge 83 and intersects the cross bore 85.

The lockset 500 includes an inside assembly 510 configured for mounting on the door inner side 81, an outside assembly 520 configured for mounting on the door outer side 82, and a center assembly 530 configured for mounting to the door edge 83. The inside assembly 510 includes an inside handle 512 and an inside chassis 514, the outside assembly 520 includes an outside handle 522 and an outside chassis 524, and the center assembly 530 includes a latch mechanism 90. The lockset 500 further includes a primary mechanism 181 operable to perform a primary function and at least one secondary mechanism 182 operable to perform a secondary function. In the illustrated form, the latch mechanism 90 defines the primary mechanism 181, and each of the inside chassis 514 and the outside chassis 524 includes a secondary mechanism 182. As described in further detail below, each of the inside handle 512 and the outside handle 522 may be provided in the form of a handle 200 having a graspable portion 202 and a shank 204, and each of the inside chassis 514 and the outside chassis 524 may be provided in the form of a chassis 100.

Figure 2:
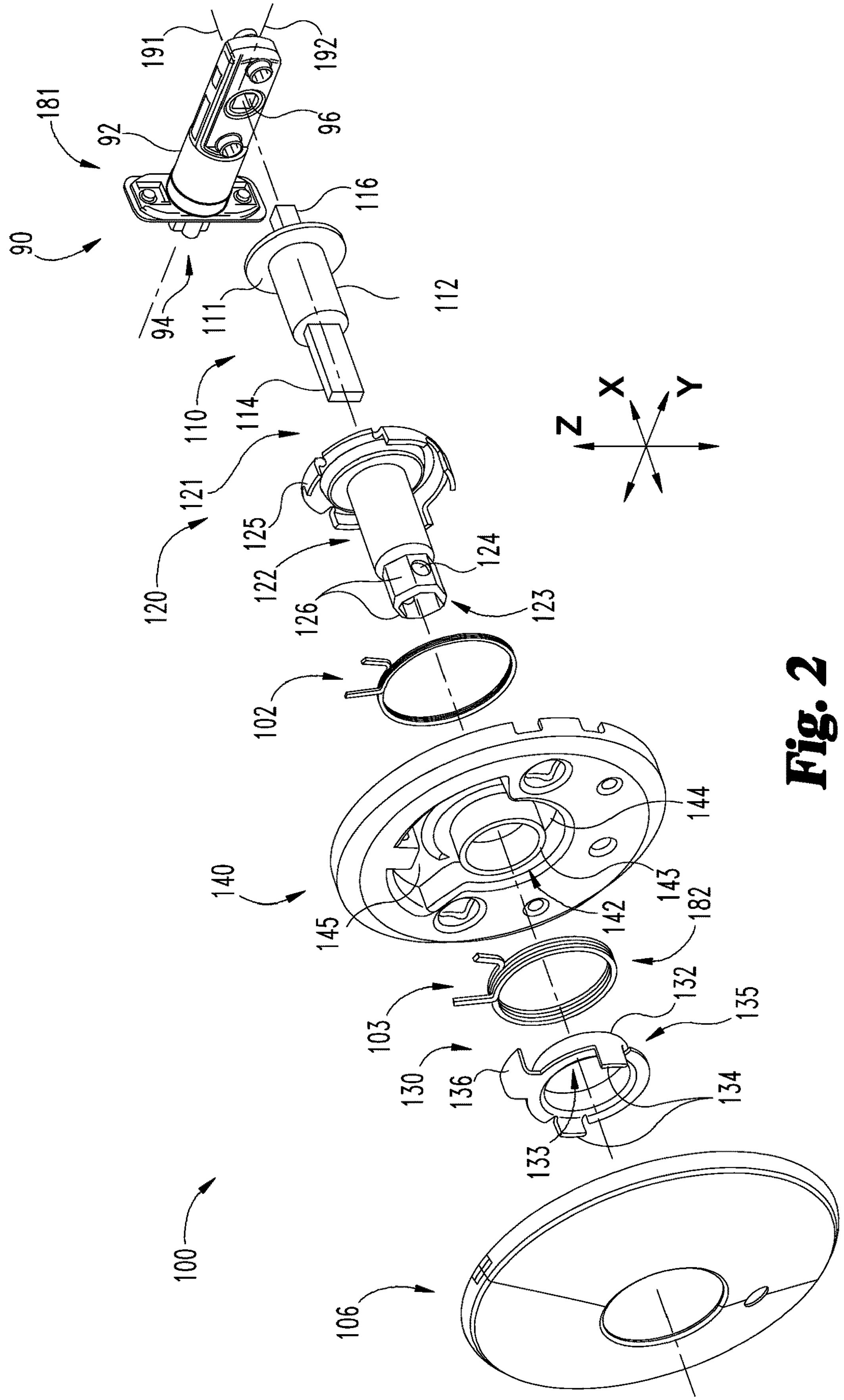
FIG. 2 is an exploded assembly view of a chassis which may be utilized in the lockset illustrated in FIG. 1.
Figure 3:
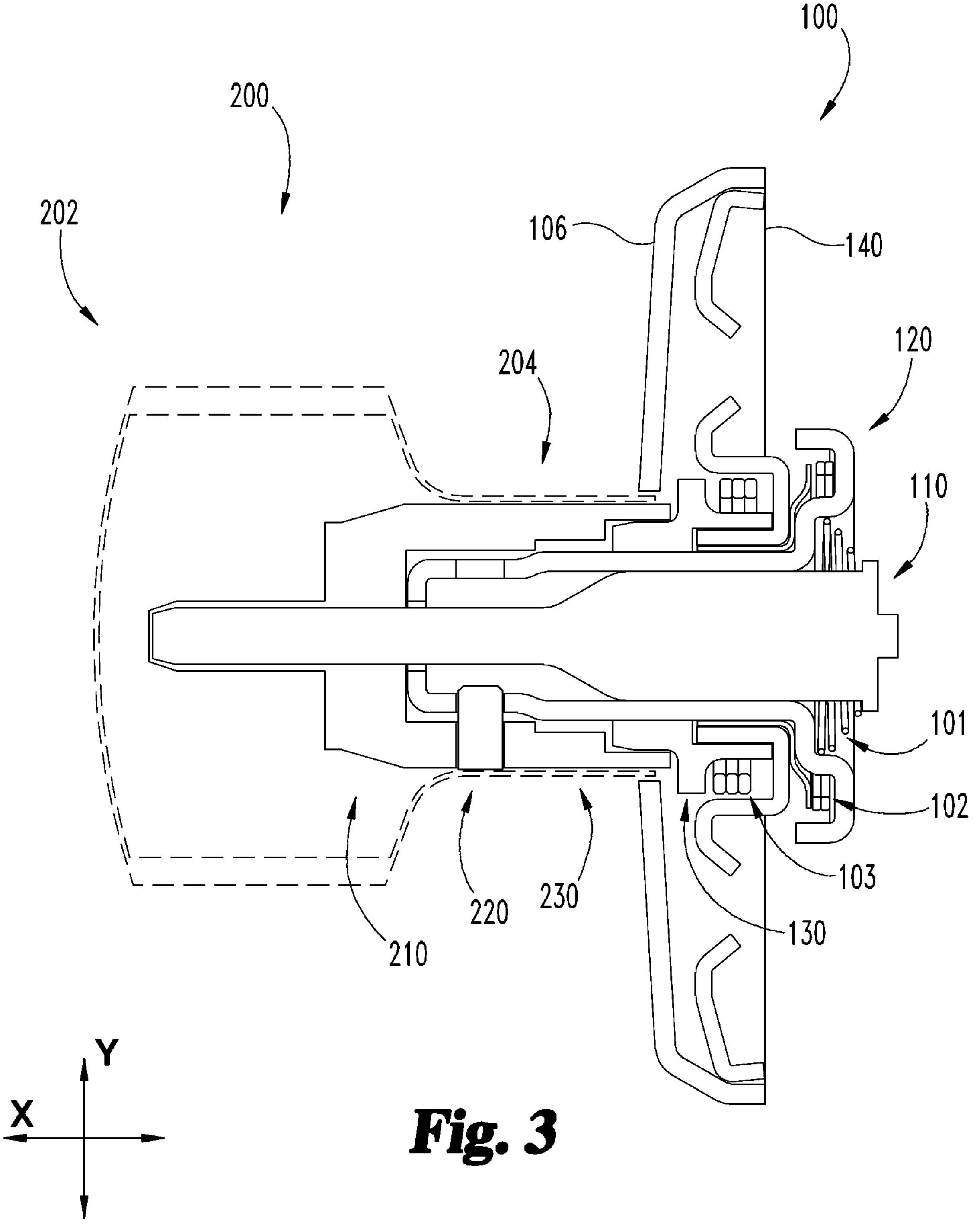
FIG. 3 is a cross-sectional illustration of an assembly including the chassis illustrated in FIG. 2 and a handle according to one embodiment.

With additional reference to FIGS. 2 and 3, a chassis 100 according to one embodiment includes a primary actuator in the form of a drive spindle 110, a support spindle 120, a secondary actuator in the form of a spring plate 130, and a housing 140 configured for mounting adjacent a corresponding face 81, 82 of the door 80. The chassis 100 may further include a first torsion spring 102, a second torsion spring 103, and/or a rose 106. In the illustrated form, the secondary mechanism 182 of the lockset 500 includes the second torsion spring 103. As described in further detail below, the primary mechanism 181 including the latch mechanism 90 is actuated by the primary actuator 110, and the secondary mechanism 182 including the torsion spring 103 is actuated by the secondary actuator 120.

As indicated above, the latch mechanism 90 serves as the primary mechanism 181 of the lockset 500, and is actuated by the primary actuator 110. The latch mechanism 90 includes a housing 92, a latchbolt 94 slidably mounted in the housing 92, and a retractor 96 engaged with the latchbolt 94. The latchbolt 94 is movable along a lateral axis 192 between an extended position and a retracted position, and may be biased toward the extended position. The latch mechanism 90 is structured to move the latchbolt 94 between the extended and retracted positions in response to rotation of the retractor 96 about a longitudinal axis 191.

In the descriptions that follow, "longitudinally outward" and "longitudinally inward" may be used to refer to longitudinal directions with respect to the latch mechanism 90, which may define a longitudinal center point of the assembled lockset 500. More specifically, "longitudinally outward" is a direction away from the latch mechanism 90, and "longitudinally inward" is a direction toward the latch mechanism 90. When the lockset 500 is assembled and installed on the door 80, the longitudinally outward direction extends toward a user of the lockset 90, and the longitudinally inward direction extends away from the user. As such, the longitudinally outward direction may alternatively be referred to as a "proximal" direction, and the longitudinally inward direction may alternatively be referred to as a "distal" direction.

The drive spindle 110 extends along the longitudinal axis 191, and includes a body 112, a post 114 extending from a proximal end of the body 112, and a hub 116 extending from a distal end of the body 112. The post 114 is structured to engage the handle 200 to rotationally couple the handle 200 with the drive spindle 110. The hub 116 is structured to matingly engage the retractor 96, and an axial compression spring 101 may engage a flange 111 of the drive spindle 110 to urge the hub 116 into engagement the retractor 96. With the hub 116 engaged with the retractor 96, rotation of the drive spindle 110 about the longitudinal axis 191 drives the latchbolt 94 along the lateral axis 192, thereby actuating the first mechanism 181. In other words, the primary mechanism 181 is actuated by the primary actuator 110.

The support spindle 120 is rotatably mounted to the housing 140, and includes a distal plate portion 121 and a tube portion 122 extending proximally from the plate portion 121. The tube portion 122 has a proximal end 123, which includes a lateral aperture 124 structured to receive a coupling member such as a set screw 104. In the illustrated form, the proximal end 123 has a non-circular cross-section defined in part by two pairs of flats 126, and is operable to transmit torque between the support spindle 120 and the handle 200. In other forms, the proximal end 123 need not be capable of transmitting torque to the handle 200, and may have a circular cross-section. The plate portion 121 includes a flange 125 which extends proximally toward the housing 140. The first torsion spring 102 is mounted between the plate portion 121 and the housing 140, is engaged with the flange 125 and an extension on the housing 140, and rotationally biases the drive spindle 120 toward a home position. Accordingly, when the spindle 120 is rotationally coupled with the handle 200, the first torsion spring 102 provides a first rotational biasing force which contributes to a total return torque urging the handle 200 toward a home position.

The spring plate 130 includes an annular body 132, a pair of proximally extending arms 134 defining an engagement section 135, and a distally extending flange 136. The engagement section 135 is operable to engage the handle 200 to rotationally couple the handle 200 and the spring plate 130. As described in further detail below, the handle 200 may be engaged with the engagement section 135 and rotationally coupled with the spring plate 130, or may remain disengaged from the engagement section 135 and rotationally decoupled from the spring plate 130. The flange 136 is structured to engage the secondary mechanism 182 of the lockset 180 such that rotation of the spring plate 130 actuates the secondary mechanism 182.

When the handle 200 is rotationally coupled with the secondary actuator 130, the handle 200 is operable to actuate the secondary mechanism 182, and the secondary mechanism 182 may therefore be considered active. When the handle 200 is rotationally decoupled from the secondary actuator 130, the handle 200 is not operable to actuate the secondary mechanism 182, and the secondary mechanism 182 may therefore be considered inactive. In the illustrated embodiment, the secondary mechanism 182 is a secondary biasing mechanism including the second torsion spring 103. In other embodiments, the secondary mechanism 182 may include alternative features, and the second torsion spring 103 may be omitted from the chassis 100. Further details regarding illustrative alternative embodiments of the secondary mechanism 182 are provided below.

The second torsion spring 103 is mounted between the spring plate 130 and the housing 140, and is engaged with the flange 136 and a protrusion 145 on the housing 140. More specifically, the flange 136 is engaged with the second torsion spring 103 such that rotation of the spring plate 130 deforms the spring 103, thereby causing the spring 103 to exert a return torque urging the spring plate 130 toward a home position. Accordingly, when the secondary mechanism 182 of the illustrated embodiment is active, the second torsion spring 103 is operable to provide a second rotational biasing force, which contributes to a total torque urging the handle 200 toward a home position.

The housing 140 includes a central opening 142 defined by an annular wall 143, and a recess 144 defined in part by the annular wall 143. The tubular portion 122 of the support spindle 120 extends through the opening 142 and is rotatably supported by the annular wall 143. The annular wall 143 also passes through a central opening 133 formed by the spring plate annular body 132, and rotatably supports the spring plate 130. The housing 140 also includes a protrusion 145 which acts as an anchor point for the second torsion spring 103.

Figure 4:
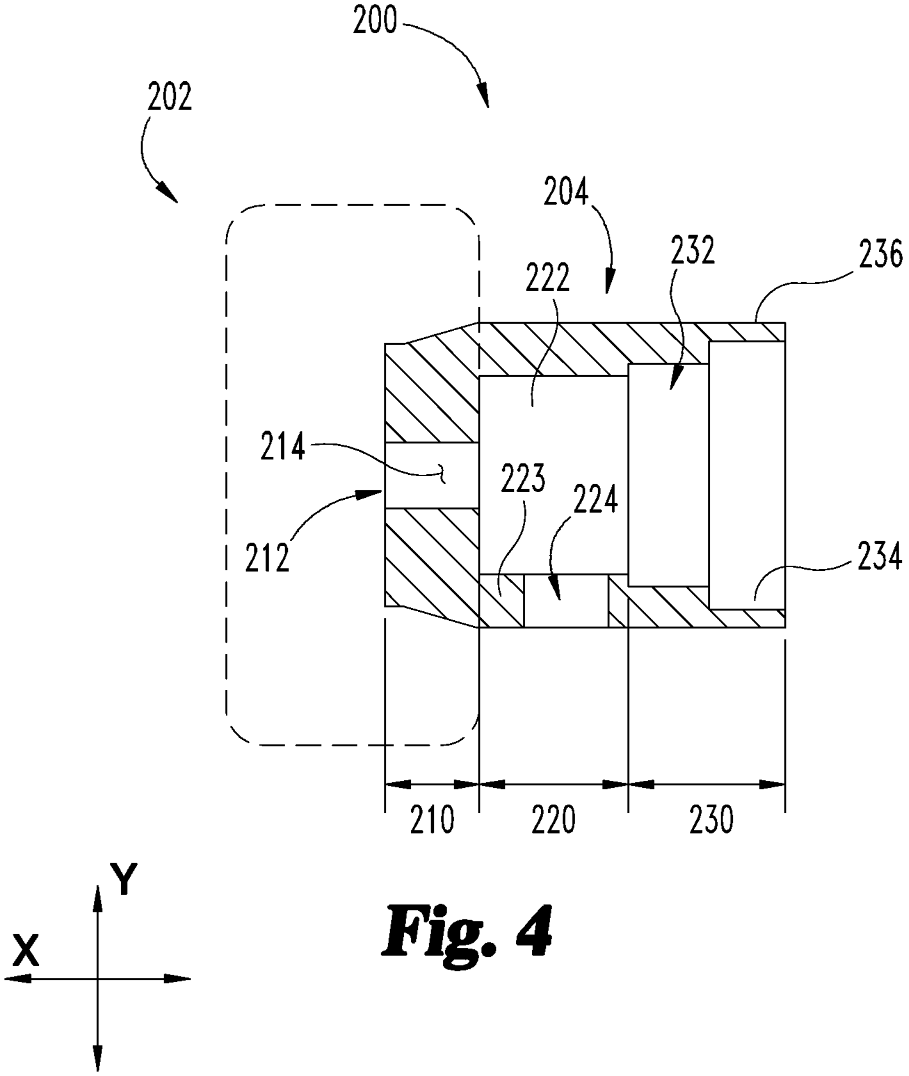
FIG. 4 is a cross-sectional illustration of a portion of the handle illustrated in FIG. 3.
Figure 5:
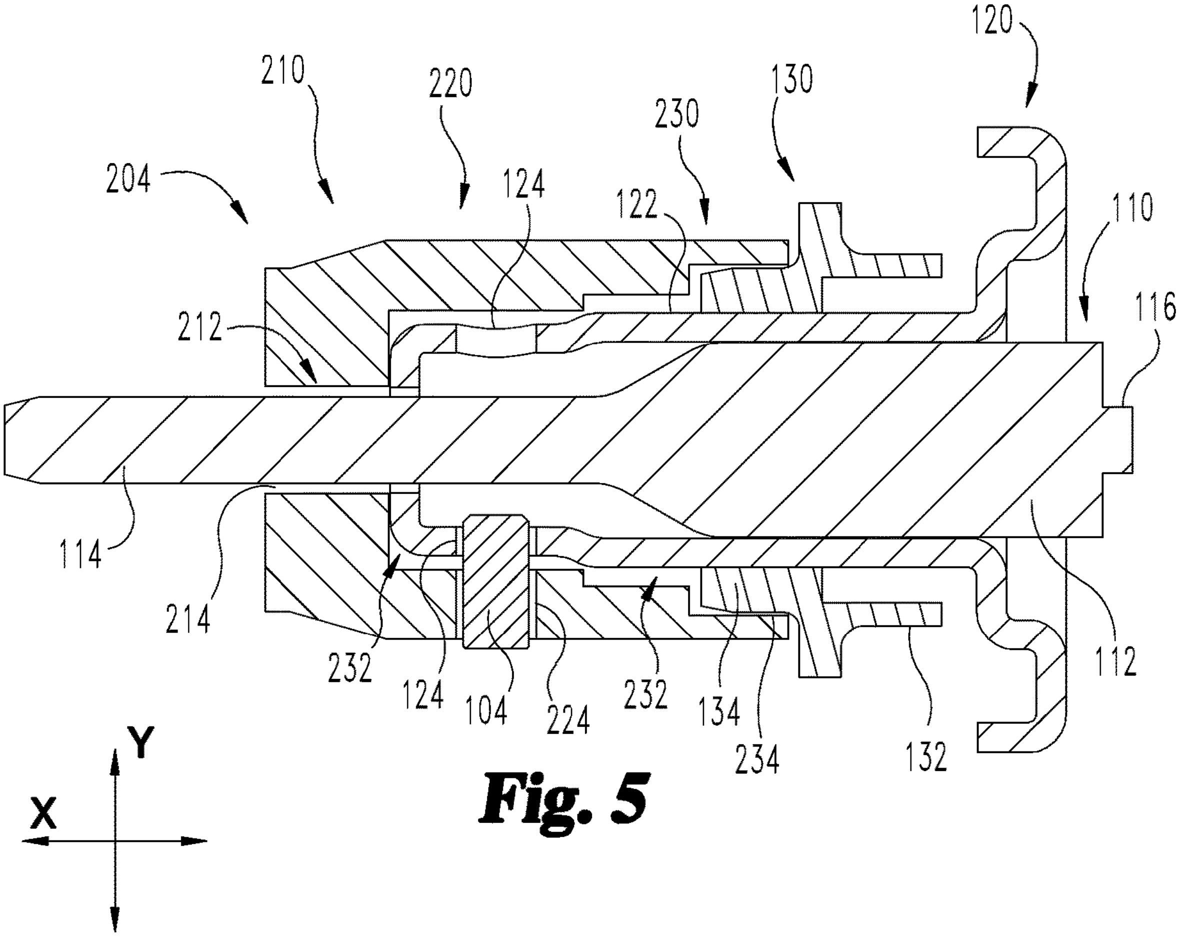
FIG. 5 is a cross-sectional illustration of a portion of the assembly illustrated in FIG. 3.

Further details of the lockset 500 are illustrated in FIGS. 4 and 5. More specifically, FIG. 4 is a schematic representation of the handle 200, and FIG. 5 illustrates the drive spindle 110, the support spindle 120, the spring plate 130, and the shank 204 when the handle 200 is mounted to the chassis 100. The shank 204 includes a proximal section 210, an intermediate section 220, and a distal section 230. As described in further detail below, the shank 204 is structured to engage various features of the chassis 100 to activate certain functions of the lockset 500.

The proximal section 210 includes a proximal opening 212 having a non-circular cross-section defined by a plurality of walls 214. The opening 212 is structured to receive the proximal end of the drive spindle post 114, and the walls 214 are structured engage the post 114 to transmit torque between the handle 200 and the drive spindle 110. When the handle 200 is mounted to the chassis 100, the post 114 is received in the opening 212, and the handle 210 is rotationally coupled to the drive tube 110 at the proximal section 210. As a result, rotation of the handle 200 causes a corresponding rotation of the drive spindle 110, which in turn actuates the latch mechanism 90. In other words, the primary actuator 110 is actuated by the proximal section 210. The proximal section 210 may therefore be referred to as a first or primary actuating section of the shank 204.

The intermediate section 220 includes an intermediate opening 222 defined at least in part by a wall 223, and an aperture 224 extending through the wall 223. The intermediate opening 222 is structured to receive the proximal end 123 of the support spindle 120. When the handle 200 is mounted on the chassis 100, the support spindle proximal end 123 extends into the intermediate opening 222. In this configuration, the apertures 124, 224 of the support spindle 120 and the intermediate section 220 are aligned with one another, and a coupling member 104 may be inserted into the apertures 124, 224. When received in the apertures 124, 224, the coupling member 104 longitudinally couples the intermediate section 220 and the support spindle 120 such that axial loads are transmitted between the handle 200 and the chassis 100. For example, a proximal pulling force on the handle 200 may be transmitted to the support spindle 120 via the intermediate section 220, thereby causing the support spindle plate portion 121 to engage the housing 140. With the lockset 500 installed on the door 80, the longitudinal force is transmitted to the door 80, thereby imparting a closing or opening force to the door 80. As such, the intermediate section 220 may be referred to as a load bearing section.

In the illustrated form, the coupling member 104 is a set screw which is screwed into the apertures 124, 224. It is also contemplated that the coupling member 104 may be another element operable to transmit axial loads between the load bearing section 220 and the support spindle 120, such as a spring-biased lever catch. The coupling member 104 may also rotationally couple the load bearing section 220 and the support spindle 120, such that the return torque provided by the first torsion spring 102 urges the handle 200 toward a home position.

The intermediate opening 222 may have a geometry which corresponds to that of the support spindle proximal end 123, such that engagement between the load bearing section 220 and the support spindle 120 provides radial support for the shank 204. In certain embodiments, the opening 222 and the support spindle end 123 may be structured to rotationally couple the intermediate section 220 and the support spindle 120 prior to insertion of the coupling member 104. In such embodiments, direct engagement between the intermediate section 220 and the support spindle 120 may reduce shear stresses on the coupling member 104. In other embodiments, the intermediate opening 222 may have a circular cross-section, and the intermediate section 220 may be rotationally coupled to the support spindle by the coupling member 104 alone.

The distal section 230 includes a distal opening 232 having a recessed portion 234 formed in a sleeve 236. When the handle 200 is mounted to the chassis 100, the sleeve 236 extends through the rose 106, and the spring plate arms 134 are received in the recessed portion 234. As described in further detail below, the distal section 230 is operable to selectively engage the secondary actuator 130, and may therefore be referred to as a secondary actuating section. In certain embodiments, the distal section 230 may be an idle secondary actuating section which does not engage the secondary actuator 130, for example as described below with reference to FIGS. 6-8. In other embodiments, the distal section 230 may be an active secondary actuating section which is engaged with the secondary actuator 130, for example as described below with reference to FIGS. 9-11.

FIGS. 6-11 illustrate handles according to further embodiments, including a knob 300 and a lever 400. Each of the handles may be an implementation of the handle 200 described above. Unless indicated otherwise, similar reference characters are used to indicate similar elements and features. In the interest of conciseness, the following descriptions focus primarily on elements and features that are not specifically described above with reference to the handle 200.

Figure 7:
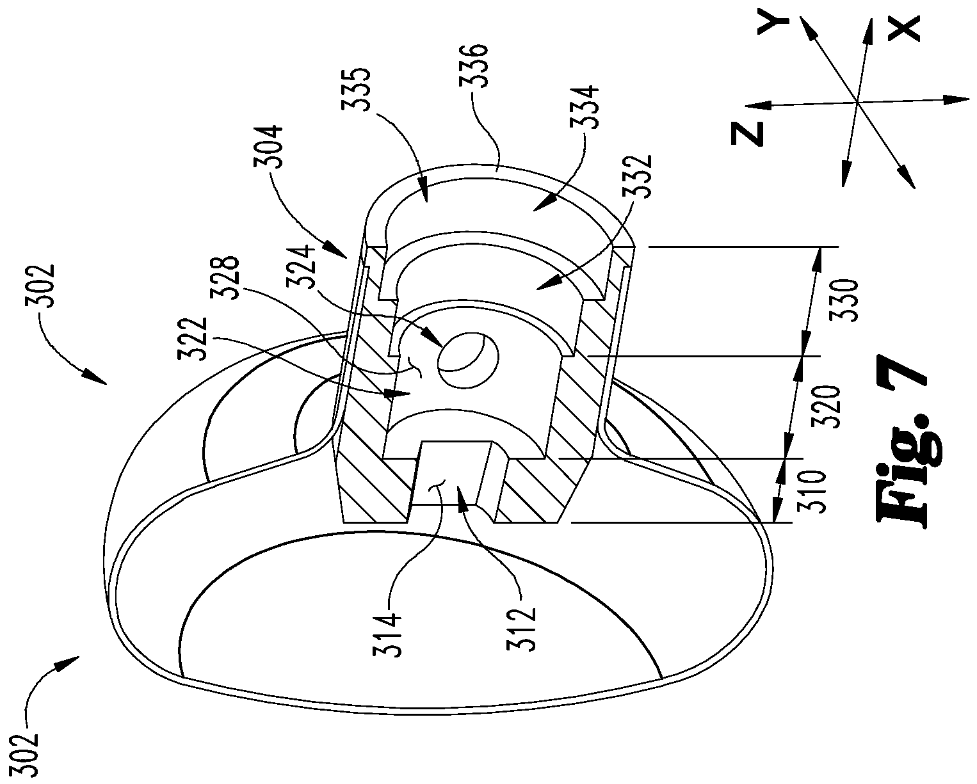
FIG. 7 is a cross-sectional illustration of the knob illustrated in FIG. 6.
Figure 6:
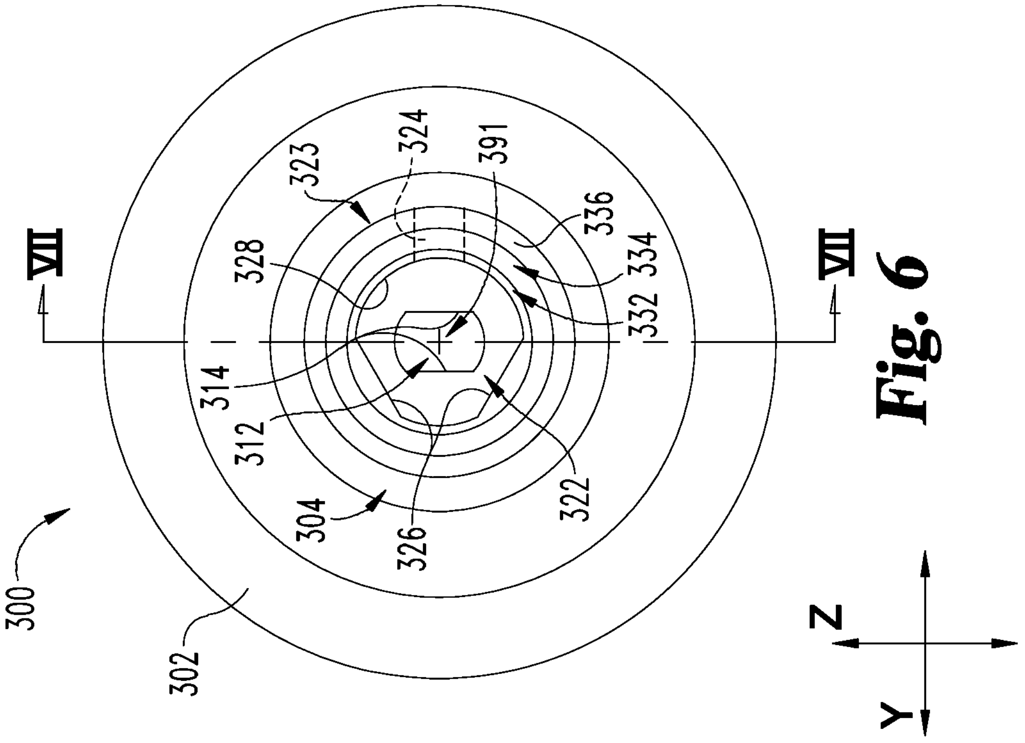
FIG. 6 is a plan view of a knob according to one embodiment.
Figure 8:
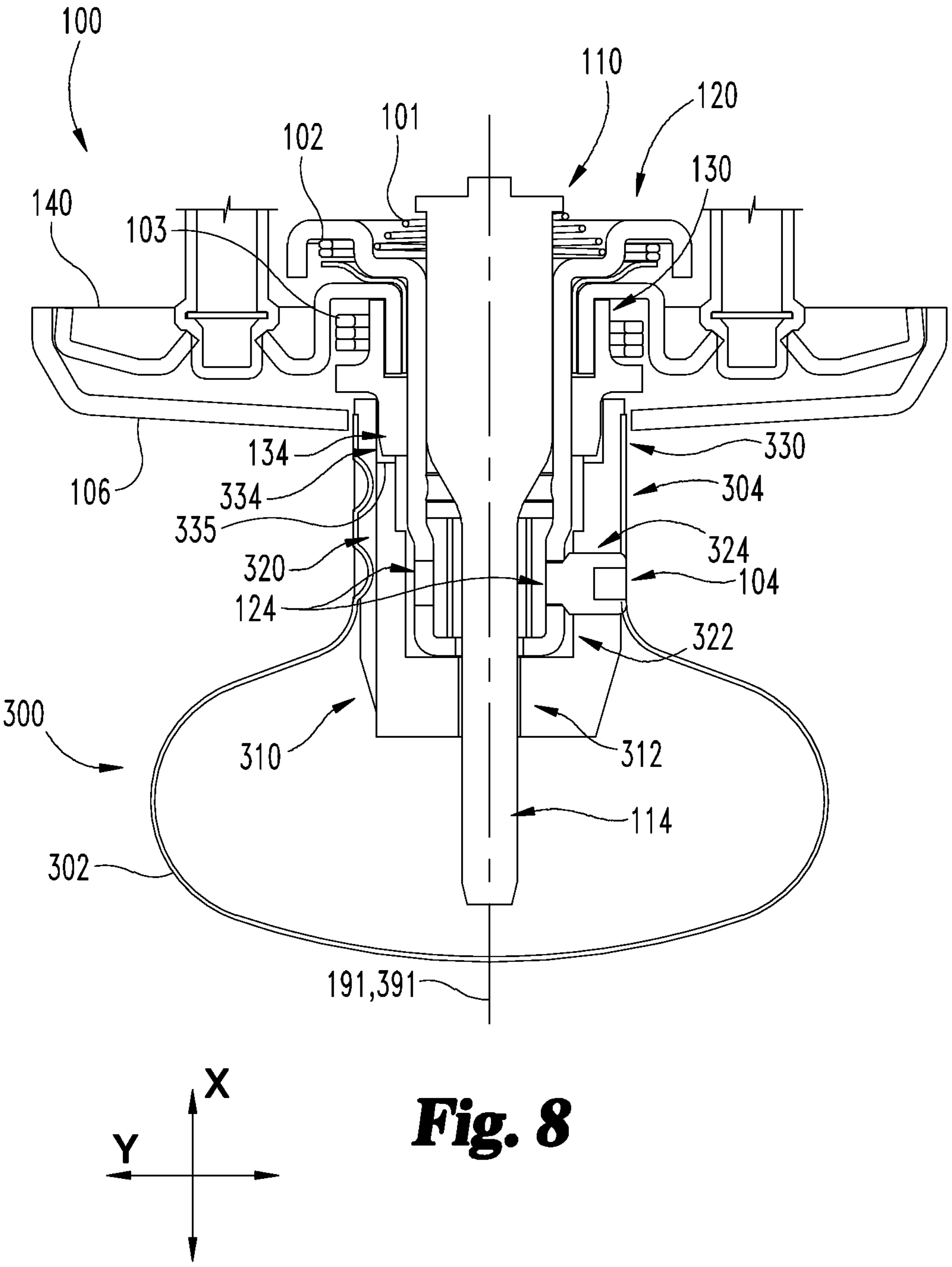
FIG. 8 is a cross-sectional illustration of an assembly including the knob illustrated in FIG. 6 and the chassis illustrated in FIG. 2.

With reference to FIGS. 6-8, a knob 300 according to one embodiment includes a manually graspable portion in the form of a knob portion 302, and a shank 304 extending distally from the knob portion 302. While other configurations are contemplated, the illustrated knob portion 302 is substantially hollow, and may be symmetric about a rotational axis 391 of the knob 300. The knob portion 302 may, for example, be formed of a thin gauge sheet metal which is crimped or otherwise secured to the shank 304.

The intermediate opening 322 is defined in part by a pair of angled flats 326, which are operable to flushly engage the flats 126 of the support spindle 120. The intermediate opening 322 may further be defined in part by an arcuate inner surface 328 of the wall 323, and the aperture 324 may extend through the wall 323 via the arcuate surface 328. Additionally, the recessed portion 334 of the distal opening 332 defines an annular recess 335 such that the sleeve 336 has a constant inner diameter.

With specific reference to FIG. 8, when the knob 300 is mounted to the chassis 100, the drive spindle 110 extends into the proximal opening 312, the support spindle 120 extends into the intermediate opening 322, and the spring plate 130 extends into the distal opening 332. In the proximal section 310, the walls 314 engage the support spindle post 114 in the manner described above with reference to FIG. 5, thereby rotationally coupling the knob 300 and the drive spindle 110. The knob 300 is operable to rotate the primary actuator or drive spindle 110 via the proximal section 310, and the proximal section 310 may therefore be considered a primary actuating section.

In the intermediate section 320, the support spindle proximal end 123 is received in the intermediate opening 322 such that the knob flats 326 engage one pair of the support spindle flats 126. The engaged flats 126, 326 rotationally couple the knob 300 and the support spindle 120. Additionally, the knob aperture 324 is aligned with the support spindle aperture 124, and the coupling member 104 extends through the apertures 124, 324. The coupling member 104 longitudinally couples the support spindle 120 to the knob 300 at the intermediate section 320. The intermediate section 320 transmits axial loads between the knob 300 and the support spindle 120, and may therefore be considered a load bearing section.

In the distal section 330, the spring plate arms 134 extend into the recessed portion 334 such that the engagement section 135 is received in the annular recess 335. The sleeve 336 may extend through the rose 106 and circumferentially surround the engagement section 135. The annular recess 335 has an inner diameter greater than a distance between the radially outer surfaces of the arms 124, which may be considered an outer diameter of the engagement section 135. In other embodiments, the annular recess 335 may be replaced with an annular boss having an outside diameter less than the inside diameter of the engagement section 135. In either event, the recessed section 334 does not engage the arms 134, and the distal section 330 is disengaged from the spring plate 130. The disengaged distal section 330 is rotationally decoupled from the spring plate 130, thereby allowing the secondary mechanism 182 to remain idle during rotation of the knob 300. The distal or secondary actuating section 330 may therefore be considered an idle secondary actuating section.

Figure 10:
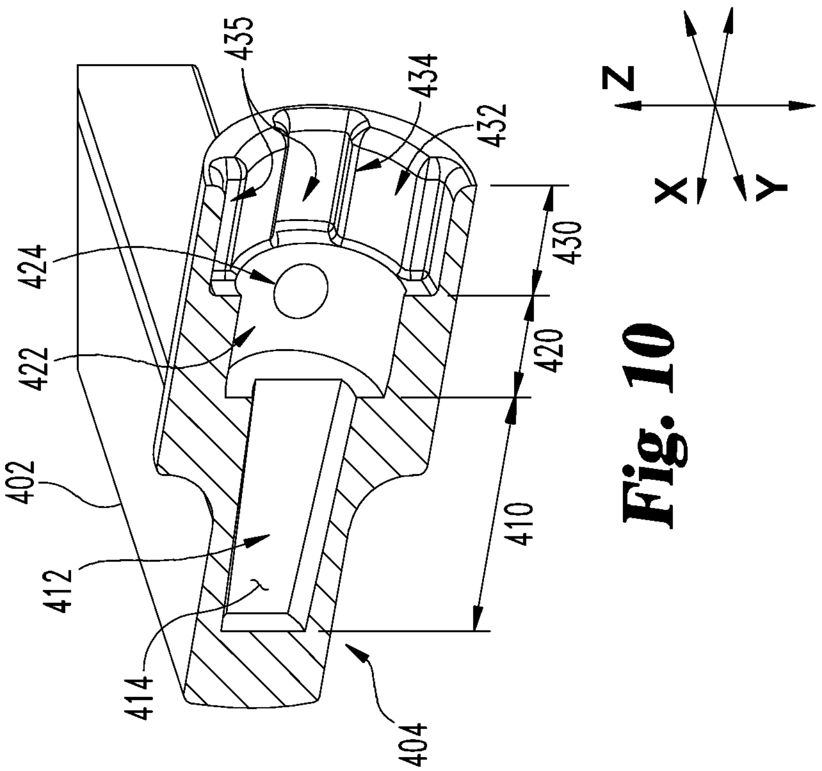
FIG. 10 is a cross-sectional illustration of the lever illustrated in FIG. 9.
Figure 9:
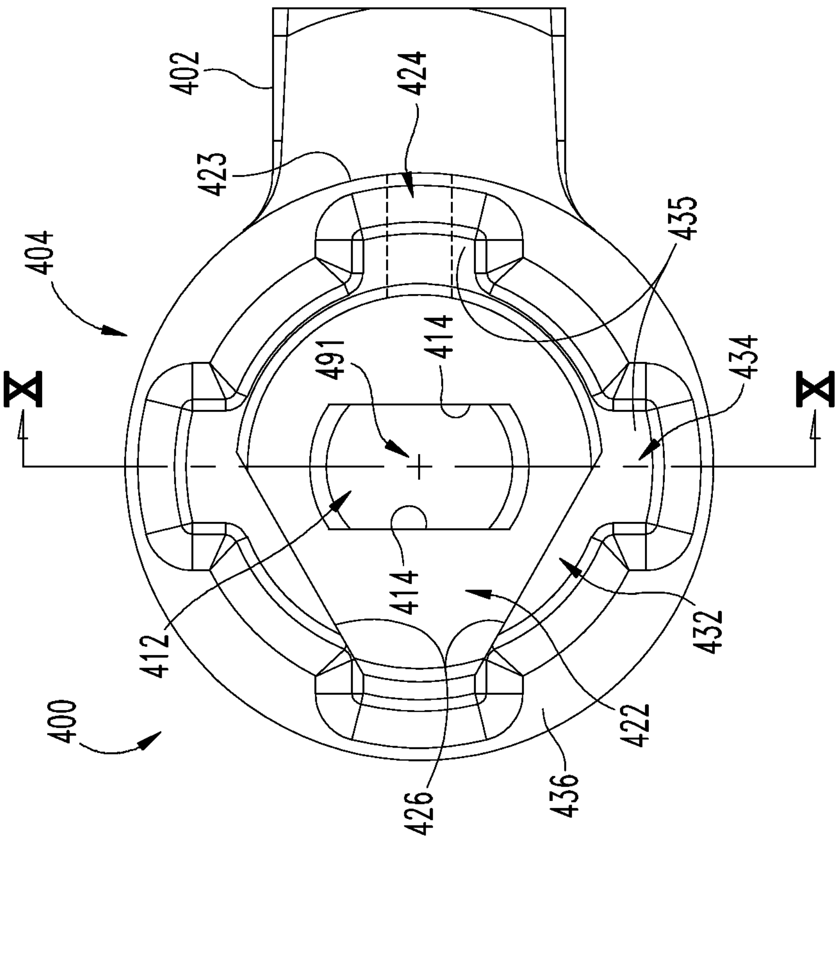
FIG. 9 is a plan view of a lever according to one embodiment.
Figure 11:
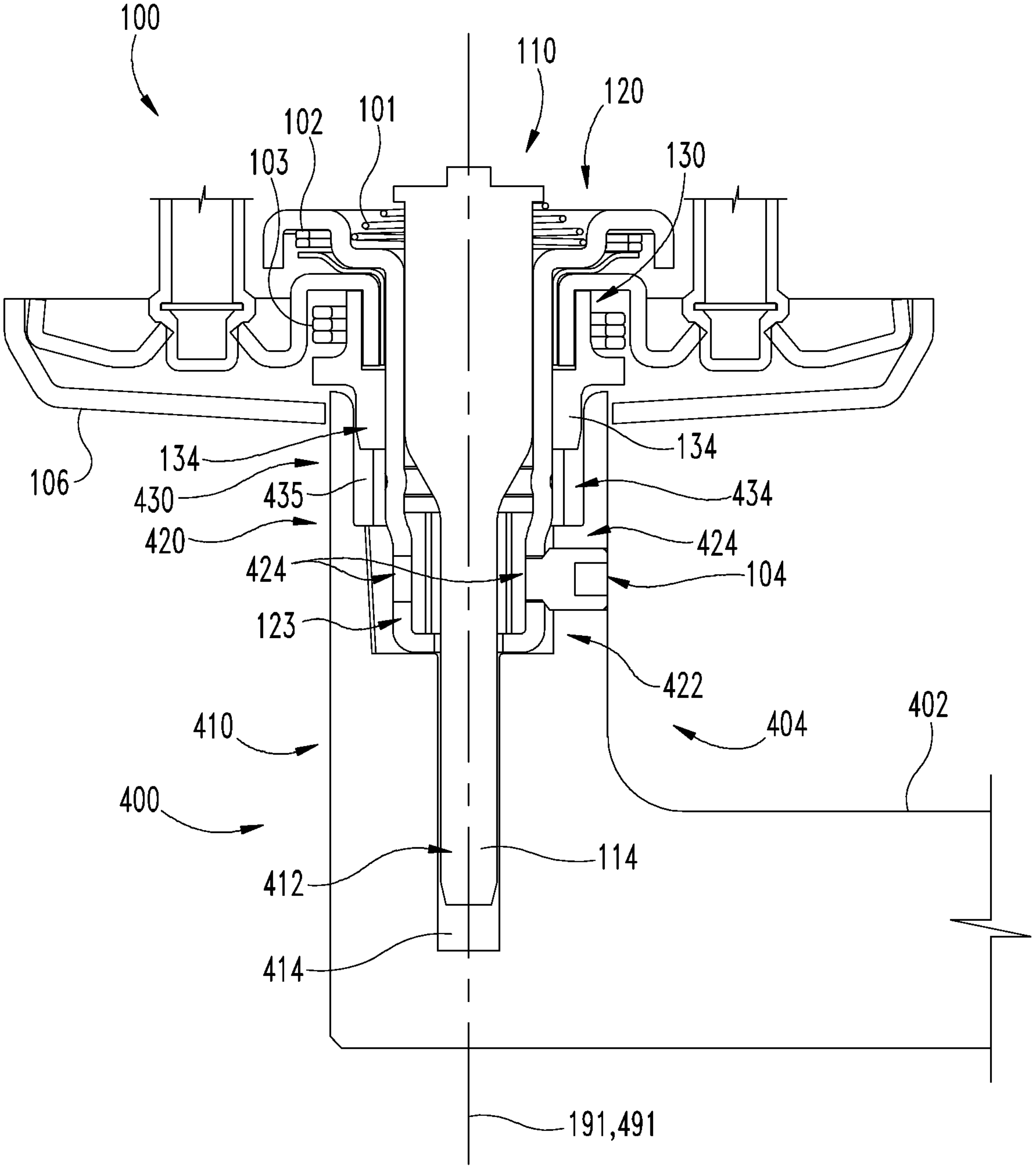
FIG. 11 is a cross-sectional illustration of an assembly including the lever illustrated in FIG. 9 and the chassis illustrated in FIG. 1.

With reference to FIGS. 9-11, a lever 400 according to one embodiment includes a manually graspable portion in the form of a lever portion 402, and a shank 404 extending distally from the lever portion 402. While other configurations are contemplated, the illustrated lever portion 402 is substantially solid and is integrally formed with the shank 404. The proximal and intermediate sections 410, 420 of the lever 400 are substantially similar to the proximal and intermediate sections 310, 320 of the knob 300, and similar reference characters are used to indicate similar elements and features. For example, the proximal section 410 of the lever 400 includes features 412, 414 analogous to corresponding features 312, 314 of the proximal section 310 of the knob 300, and the intermediate section 420 of the lever 400 includes features 422, 423, 424, 426 analogous to corresponding features 322, 323, 324, 326, of the intermediate section 320 of the knob 300. Likewise, the distal section 430 of the lever 400 includes features 432, 436 analogous to corresponding features 332, 336 of the distal section 330 of the knob 300. In the distal section 430, however, the recessed portion 434 defines a plurality of recesses in the form of channels 435. The channels 435 are angularly offset from one another with respect to a rotational axis 491 of the lever 400, and are structured to receive the arms 134 of the spring plate 130.

With specific reference to FIG. 11, when the lever 400 is mounted to the chassis 100, the proximal section 410 and the intermediate section 420 function as a primary actuating section and a load bearing section in a manner similar to that described above with reference to the corresponding sections 310, 320 of the knob 300. In the distal section 430, the spring plate arms 134 extend into the channels 435 such that the engagement section 135 is received in the recessed portion 434. With the arms 134 received in the channels 435, the distal section 430 is engaged with and rotationally coupled to the spring plate 130, thereby activating the secondary mechanism 182. The distal or secondary actuating section 430 may therefore be considered an active secondary actuating section.

Figure 12:
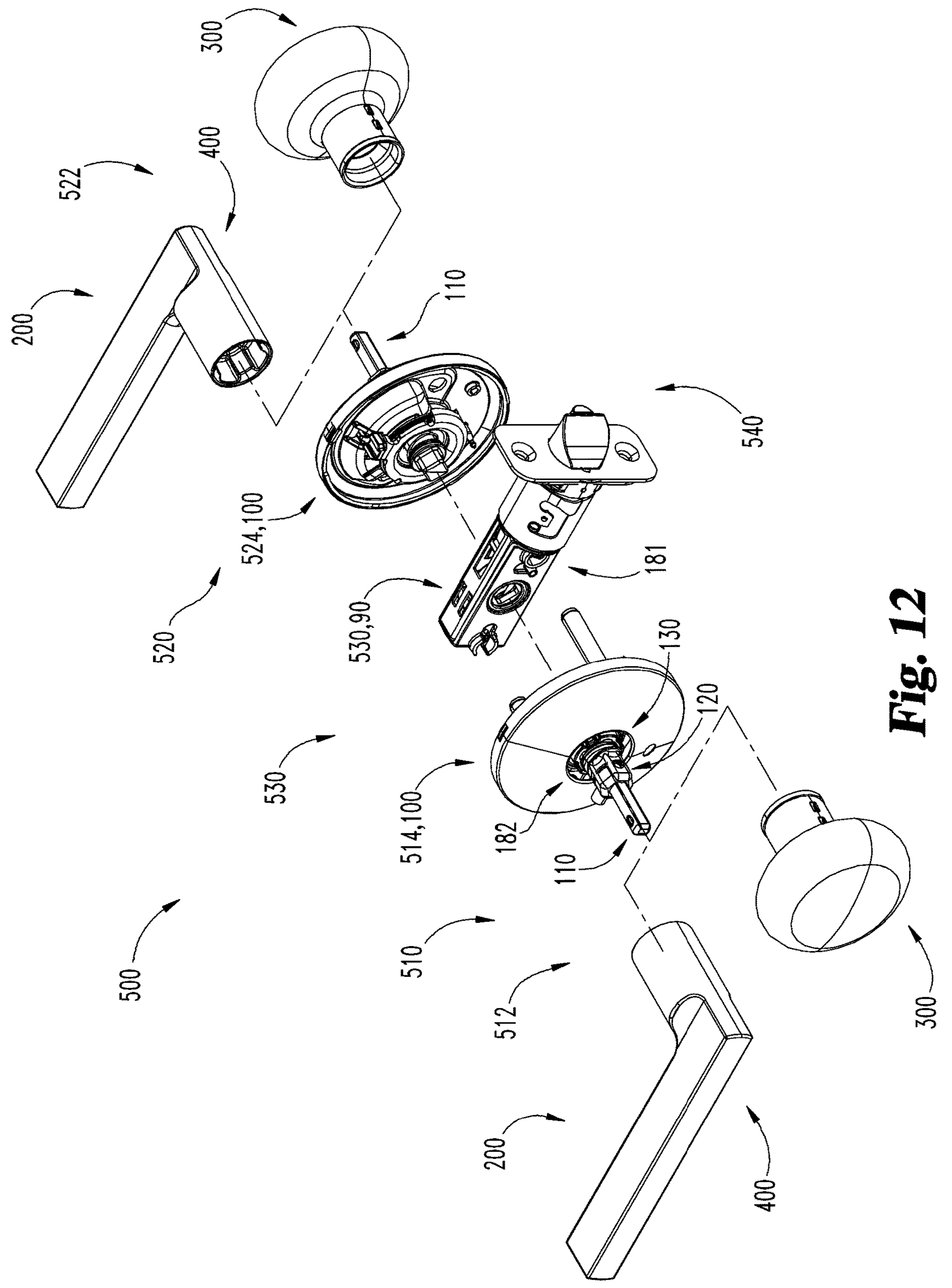
FIG. 12 is an exploded assembly view illustrating two forms of the lockset illustrated in FIG. 1.

With additional reference to FIG. 12, the inside chassis 514, the outside chassis 524, and the center assembly 530 define a core 540 of the lockset 500. The lockset 500 may be provided in a number of different lockset configurations by selecting different configurations of the inside and outside handles 512, 522 while retaining the core 540. In certain forms, the inside and outside handles 512, 522 may take the form of the knob 300 and/or the lever 400 described above. In other embodiments, the inside and outside handles 512, 522 may be provided as another form of the handle 200.

Figure 13:
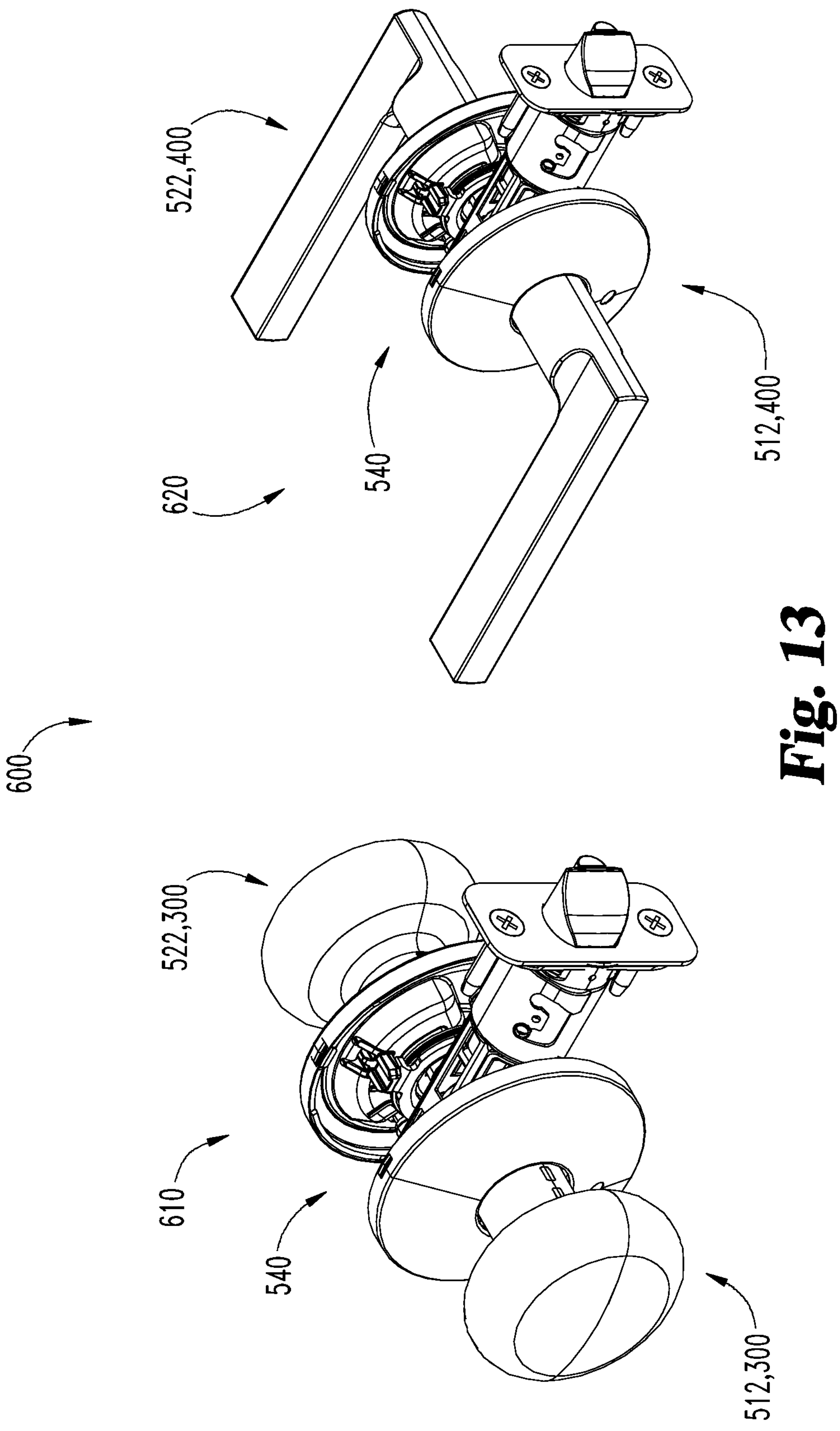
FIG. 13 is a perspective illustration of a product line including the two forms of lockset illustrated in FIG. 12.

With additional reference to FIG. 13, illustrated therein is a product line 600 including a plurality of lockset configurations 610, 620. Each of the lockset configurations 610, 620 may represent an embodiment of the above-described lockset 500, and includes the core 540, the outside handle 512, and the inside handle 522. In the first configuration 610, each of the handles 512, 522 is provided in the form of the above-described knob 300, such that each of the handles 512, 522 is disengaged from the corresponding secondary actuator 130. As a result, each of the secondary mechanisms 182 is inactive in the first lockset configuration 610. In the second configuration 620, each of the handles 512, 522 is provided in the form of the above-described lever 400, such that each of the handles 512, 522 is engaged with the corresponding secondary actuator 130. As a result, each of the secondary mechanisms 182 is active in the second lockset configuration 620.

Due to the fact that each of the configurations 610, 620 utilizes the common core 540, the lockset 500 may be changed from the first configuration 610 to the second configuration 620 by replacing the knobs 300 with the levers 400. Similarly, the lockset 500 may be changed from the second configuration 620 to the first configuration 610 by replacing the levers 400 with the knobs 300. As such, the configuration of the lockset 500 can be altered by installing a new form of handle 200 without requiring replacement of the core 540.

In the handles 200 described above, the configuration of the secondary actuating section 230 corresponds to the configuration of the manually graspable portion 202. More specifically, the knob 300 includes the knob portion 302 and the idle secondary actuating section 330, and the lever 400 includes the lever portion 402 and the active secondary actuating section 430. It is also contemplated that two embodiments of the handle 200 may include the same manually graspable portion 202 and different configurations of the secondary actuating section 230.

Figure 14A:
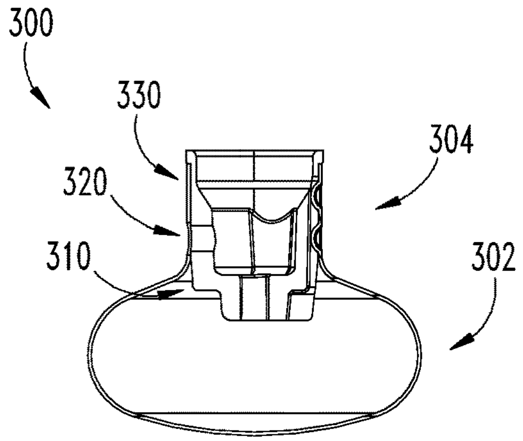
FIGS. 14*a* and 14*b* are cross-sectional illustrations of the knob illustrated in FIG. 5 and an alternative embodiment of the knob, respectively.
Figure 14B:
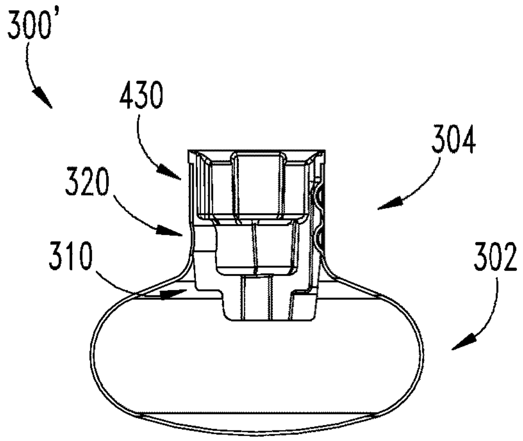

By way of example, FIG. 14*a* illustrates the above-described knob 300, and FIG. 14*b* illustrates an alternative knob 300'. Each of the knobs 300, 300' includes a knob portion 302 and a shank 304 including a primary actuating section 310 and a load bearing section 320. As noted above, the knob 300 also includes an idle secondary actuating section 330. In contrast, the alternative knob 300' includes the active secondary actuating section 430 described above with reference to the lever 400. As such, the knobs 300, 300' may appear the same to an end user, while providing the lockset 500 with different functionalities. For example, the secondary mechanism 182 would be inactive in a lockset including the knob 300, and would be active in a lockset including the alternative knob 300'.

Figure 15A:
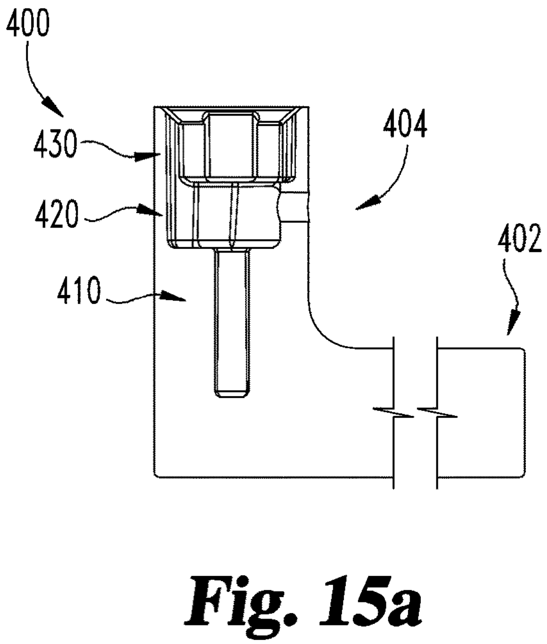
FIGS. 15*a* and 15*b* are cross-sectional illustrations of the lever illustrated in FIG. 8 and an alternative embodiment of the lever, respectively.
Figure 15B:
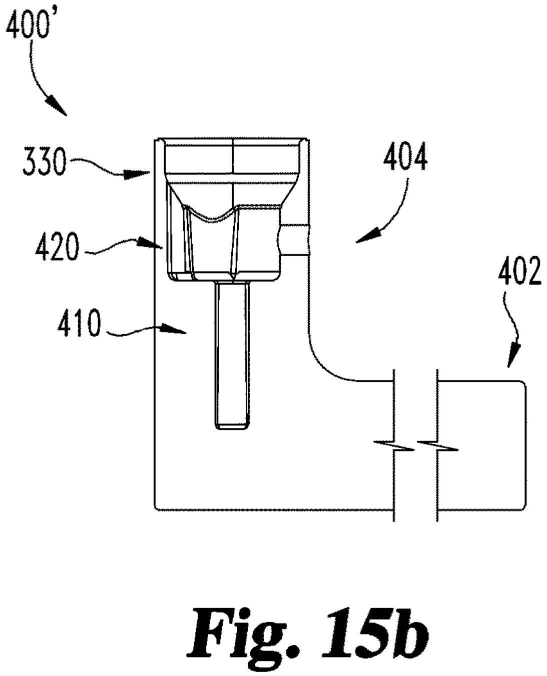

Similarly, FIG. 15*a* illustrates the above-described lever 400, and FIG. 15*b* illustrates an alternative lever 400'. Each of the levers 400, 400' includes a lever portion 402 and a shank 404 including a primary actuating section 410 and a load bearing section 420. As noted above, the lever 400 also includes an active secondary actuating section 430. In contrast, the alternative lever 400' includes the idle secondary actuating section 330 described above with reference to the knob 300. As such, the levers 400, 400' may appear the same to an end user, while providing the lockset 500 with different functionalities. For example, the secondary mechanism 182 would be active in a lockset including the lever 400, and would be inactive in a lockset including the alternative lever 400'.

In the embodiments described above, the secondary mechanism 182 is a torsion spring 103 operable to provide a supplemental return torque to the handle 200. It is also contemplated that the secondary mechanism 182 may take another form, such as a request to exit (RX) switch. For example, the lockset 500 may include the active knob 300' as the inner handle 512 and the idle handle 300 as the outer handle 522. In such forms, the RX switch or secondary mechanism 182 of the inside assembly 510 may be active while the RX switch or secondary mechanism 182 of the outside assembly 520 remains inactive.

In further embodiments, the lockset 500 may include a locking mechanism operable to selectively prevent rotation of the outside handle 522. For example, the locking mechanism may have a locked state in which rotation of the outside handle 522 is prevented, and an unlocked state in which rotation of the outside handle 522 is permitted. In such forms, the secondary mechanism 182 may take the form of an egress release operable to transition the locking mechanism from the locked state to the unlocked state in response to rotation of the secondary actuator 130. For example, a first configuration of the lockset 500 may include the active lever 400 as the inside handle 512, and a second configuration of the lockset 500 may include the idle lever 400' as the inside handle 512.

In each of the first and second configurations, the inside handle 512 may be operable to actuate the primary mechanism 181 to retract the latchbolt 94 when the locking mechanism is in the locked state. In the first configuration, rotation of the inside handle 512 also actuates the egress release or secondary mechanism 182. As a result, the locking mechanism is transitioned to the unlocked state, thereby permitting subsequent rotation of the outside handle 522. In the second configuration, rotation of the inside handle 512 does not actuate the egress release or secondary mechanism 182. As a result, the locking mechanism remains in the locked state, and the outside handle 522 remains locked.

As is evident from the foregoing, the various forms of handles 200 described above may be structured such that each function of the handle 200 is performed primarily or entirely by a corresponding axial section of the shank 204. For example, the transmission of torque to the drive spindle 110, the transmission of axial forces to the support spindle 120, and the selective actuation of the secondary actuator may be performed by the primary actuating section 210, the load-bearing section 220, and the secondary actuating section 230, respectively. With the functions of the handle 200 provided by separate sections of the shank 204, the configuration of each of the sections 210, 220, 230 may be independently optimized to perform the desired function. In contrast, certain conventional handles may require sacrificing characteristics desired for one function in order to include characteristics desired for another of the functions.

By way of example, the shank 204 may be manufactured by a die-casting operation. As will be appreciated, certain die-casting may require that the surfaces of the shank 204 define a draft angle sufficient to enable the shank 204 to be removed from the mold. In certain circumstances, the draft angle required by one function of the handle 200 may be undesirable for performing another function of the handle 200. Due to the fact that each function of the shank 204 is performed by a corresponding one of the sections 210, 220, 230, each of the sections 210, 220, 230 may be designed with a draft angle which is optimized for the function and geometry of the section. For example, if either the function or the geometry of the primary actuating section 210 were to require a draft angle that would be undesirable for the function or geometry of the load bearing section 220, the sections 210, 220 may be designed with different draft angles. As such, a draft angle that may be required by the function or geometry of one section need not negatively affect the performance of the other sections.

In certain embodiments, a handle 200 may be configured for use with a lockset such as the lockset 500. For example, a replacement handle 200 may be sold to an end-user as a replacement for one of the handles 200 initially included in the lockset 500. In such embodiments, the replacement handle 200 may take the form of one of the handles described above. It is also contemplated that such a replacement handle 200 may include additional or alternative features. For example, the primary actuating section 210 of the replacement handle 200 may not necessarily be formed in the shank 204, but may instead be a separate component such as an adapter that rotationally couples the support spindle 120 with the primary actuator 110. In such forms, installation of the replacement handle 200 on the chassis 100 may include installing the adapter to rotationally couple the support spindle 120 with the primary actuator 110, and subsequently coupling the replacement handle 200 to the support spindle 120 in the manner described above.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
- a chassis, comprising:
  - a housing;
  - a support spindle mounted for rotation relative to the housing;
  - a splined member mounted for rotation relative to the housing; and
  - a spring rotationally biasing the splined member toward a home position; and
- a handle, comprising:
  - a shank extending along a rotational axis of the handle, wherein the shank includes a proximal section, a distal end section, and an intermediate section positioned between the proximal section and the distal end section; and
  - a manually graspable portion extending from the shank and formed closer to the proximal section than to the distal end section;
- wherein the proximal section comprises a proximal opening defined in part by a pair of proximal portion sidewalls, and wherein the rotational axis extends between the proximal portion sidewalls;
- wherein the intermediate section comprises an intermediate opening that receives the support spindle, wherein the intermediate opening is defined in part by a pair of intermediate portion sidewalls that closely engage the support spindle; and
- wherein the distal end section comprises a distal opening that receives the splined member, and wherein the distal end section comprises an active section including at least one protrusion operable to engage at least one spline of the splined member such that the active section is rotationally coupled with the splined member.

2. The system of claim 1, wherein the proximal portion sidewalls extend parallel to the rotational axis, and wherein the rotational axis is centered between the proximal portion sidewalls.

3. The system of claim 1, wherein the at least one protrusion defines at least one recess operable to receive the at least one spline.

4. The system of claim 1, wherein the at least one protrusion comprises a plurality of protrusions, wherein the at least one spline comprises a plurality of splines, and wherein the plurality of protrusions define a plurality recesses operable to receive the plurality of splines.

5. The system of claim 1, wherein the intermediate portion sidewalls are arranged oblique relative to the proximal portion sidewalls.

6. The system of claim 1, wherein the intermediate portion sidewalls are oblique to one another.

7. The system of claim 1, further comprising a set screw threadedly engaged with the shank;
- wherein the intermediate section further comprises a lateral aperture connected with the intermediate opening, and wherein the set screw is threaded into the lateral aperture such that rotation of the set screw in one direction advances the set screw into the intermediate opening to enable the set screw to engage the support spindle.

8. The system of claim 1, wherein the shank comprises a single-piece structure defining the proximal section, the intermediate section, and the distal end section;
- wherein the single-piece structure further defines the active section of the distal end section.

9. A method, comprising:
- installing a handle to a chassis comprising a housing, a support spindle mounted for rotation relative to the housing, a splined member mounted for rotation relative to the housing, and a spring rotationally biasing the splined member toward a home position, wherein the handle comprises:
  - a shank extending along a rotational axis of the handle, wherein the shank includes a proximal section, a distal end section, and an intermediate section positioned between the proximal section and the distal end section; and
  - a manually graspable portion extending from the shank and formed closer to the proximal section than to the distal end section;
  - wherein the proximal section comprises a proximal opening defined in part by a pair of proximal portion sidewalls, and wherein the rotational axis extends between the proximal portion sidewalls;
- wherein installing the handle to the chassis comprises:
  - inserting the support spindle in the intermediate opening, wherein the intermediate opening is defined in part by a pair of intermediate portion sidewalls that closely engage the support spindle; and
  - engaging the splined member with the distal end section, wherein the distal end section comprises an active section including at least one protrusion operable to engage at least one spline of the splined member such that the active section is rotationally coupled with the splined member.

10. The method of claim 9, wherein the support spindle comprises a hexagonal member.

11. The method of claim 9, further comprising:
- with the splined member engaged with the distal end section, rotationally biasing, by the spring, the handle toward the home position.

* * * * *